US 012451194B2

United States Patent
Joo

(10) Patent No.: US 12,451,194 B2
(45) Date of Patent: Oct. 21, 2025

(54) MEMORY DEVICE FOR PERFORMING READ OPERATION AND OPERATING METHOD THEREOF

(71) Applicant: SK hynix Inc., Gyeonggi-do (KR)

(72) Inventor: Byoung In Joo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 167 days.

(21) Appl. No.: 18/356,222

(22) Filed: Jul. 21, 2023

(65) Prior Publication Data

US 2024/0282388 A1    Aug. 22, 2024

(30) Foreign Application Priority Data

Feb. 22, 2023   (KR) .................. 10-2023-0023739

(51) Int. Cl.
  *G11C 7/02*      (2006.01)
  *G11C 15/04*     (2006.01)
  *G11C 16/10*     (2006.01)
  *G11C 16/26*     (2006.01)

(52) U.S. Cl.
  CPC .............. *G11C 16/26* (2013.01); *G11C 7/02* (2013.01); *G11C 15/04* (2013.01); *G11C 16/102* (2013.01)

(58) Field of Classification Search
  CPC ........... G11C 16/26; G11C 7/02; G11C 15/04; G11C 16/102; G11C 11/5642; G11C 16/0483; G11C 16/10; G11C 16/30; G11C 16/34; G11C 16/08; G11C 16/12; G11C 16/24
  See application file for complete search history.

(56) References Cited

U.S. PATENT DOCUMENTS

| | | | | |
|---|---|---|---|---|
| 2009/0003058 | A1* | 1/2009 | Kang | G11C 16/3454 |
| | | | | 365/185.18 |
| 2020/0160906 | A1* | 5/2020 | Lee | G06F 11/141 |
| 2022/0253245 | A1* | 8/2022 | Seo | G06F 3/0679 |
| 2024/0233833 | A1* | 7/2024 | Tan | G11C 16/08 |

FOREIGN PATENT DOCUMENTS

| KR | 10-2016-0004073 A | 1/2016 |
|---|---|---|
| KR | 10-2021-0114718 A | 9/2021 |

* cited by examiner

*Primary Examiner* — Mohammed A Bashar
(74) *Attorney, Agent, or Firm* — IP & T GROUP LLP

(57) ABSTRACT

A memory device includes a memory block including a plurality of pages; and a control logic configured to control, when a read command for a selected page among the plurality of pages is received, a read operation on the selected page to be performed using a plurality of read voltages, wherein the plurality of read voltages are determined based on a reference value for the selected page and a read count representing a number of times a read operation of reading data stored in the selected page is performed after a program operation of storing data in the selected page.

20 Claims, 5 Drawing Sheets

| PAGE | REFERENCE VALUE | READ COUNT | FLAG VALUE (min = 0) |
|---|---|---|---|
| PG1 | ref1 | rc1 | fv1 = ref1 − rc1 |
| PG2 | ref2 | rc2 | fv2 = ref2 − rc2 |
| PG3 | ref3 | rc3 | fv3 = ref3 − rc3 |
| PG4 | ref4 | rc4 | fv4 = ref4 − rc4 |
| PG5 | ref5 | rc5 | fv5 = ref5 − rc5 |
| ... | ... | ... | ... |

( $ref1 \geq ref2 \geq ref3 \geq ref4 \geq ref5 \geq ...$ )

FIG. 3

| FLAG VALUE | Lowest PV R1 | R2 | R3 | Middle PV R4 | R5 | R6 | Highest PV R7 |
|---|---|---|---|---|---|---|---|
| 9 | R1_9 | R2_9 | R3_9 | R4_9 | R5_9 | R6_9 | R7_9 |
| 8 | R1_8 | R2_8 | R3_8 | R4_8 | R5_8 | R6_8 | R7_8 |
| 7 | R1_7 | R2_7 | R3_7 | R4_7 | R5_7 | R6_7 | R7_7 |
| 6 | R1_6 | R2_6 | R3_6 | R4_6 | R5_6 | R6_6 | R7_6 |
| 5 | R1_5 | R2_5 | R3_5 | R4_5 | R5_5 | R6_5 | R7_5 |
| 4 | R1_4 | R2_4 | R3_4 | R4_4 | R5_4 | R6_4 | R7_4 |
| 3 | R1_3 | R2_3 | R3_3 | R4_3 | R5_3 | R6_3 | R7_3 |
| 2 | R1_2 | R2_2 | R3_2 | R4_2 | R5_2 | R6_2 | R7_2 |
| 1 | R1_1 | R2_1 | R3_1 | R4_1 | R5_1 | R6_1 | R7_1 |
| 0 | 0 | 0 | 0 | 0 | 0 | 0 | 0 |

MEMORY DEVICE FOR PERFORMING READ OPERATION AND OPERATING METHOD THEREOF

CROSS-REFERENCE TO RELATED APPLICATION

The present application claims priority under 35 U.S.C. § 119(a) to Korean patent application number 10-2023-0023739 filed on Feb. 22, 2023, the entire disclosure of which is incorporated by reference herein. BACKGROUND

1. Field of Invention

Embodiments of the present disclosure generally relate to an electronic device, and more particularly, to a memory device and an operating method thereof.

2. Description of Related Art

A storage device includes at least a memory device. The memory device may be a nonvolatile memory device such as a NAND flash memory. The nonvolatile memory device may retain information stored therein even when power is not supplied. Recently, the integration of a memory device has been made in a form in which memory cells constituting the memory device are stacked in a vertical direction on a plane. The capacity of the memory device can be increased as the integration goes higher.

However, as a distance between memory cells is narrowed, an interference phenomenon is deepened, and therefore, charges corresponding to noise may temporarily remain when a program operation of storing data in a memory cell is performed. Due to influence of the remaining charges, there may occur a concern (e.g., 1st page read fail) in that distorted data different from expected data is read in a read operation of reading the data. Some memory devices included in a storage device may be treated as failed/damaged devices, and therefore, the available storage capacity of the storage device is decreased. Meanwhile, read operations are repeatedly performed while correcting a level of a read voltage according to a fail bit of data, so that valid data can be read. However, this results in deterioration of performance as an operation time is lengthened according to the repeated read operations. Accordingly, a technique for reading undistorted valid data without performance deterioration is desired.

SUMMARY

Embodiments of the present disclosure are directed to a memory device capable of reading valid data without performance deterioration, and an operating method of the memory device.

In accordance with an aspect of the present disclosure, there is provided a memory device including: a memory block including a plurality of pages; and a control logic configured to control, when a read command for a selected page among the plurality of pages is received, a read operation on the selected page to be performed using a plurality of read voltages, wherein the plurality of read voltages are determined based on a reference value for the selected page and a read count representing a number of times a read operation of reading data stored in the selected page is performed after a program operation of storing data in the selected page.

In accordance with another aspect of the present disclosure, there is provided a method of operating a memory device, the method including: receiving a read command and an address; acquiring, as a flag value, a difference between a reference value for a selected page corresponding to the address among a plurality of pages and a read count, the read count representing a number of times a read operation is performed after a program operation on the selected page; and performing a read operation on the selected page by using a read voltage having a default level or a compensated read voltage according to the flag value.

BRIEF DESCRIPTION OF THE DRAWINGS

Example embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3 is a diagram illustrating a read voltage table in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
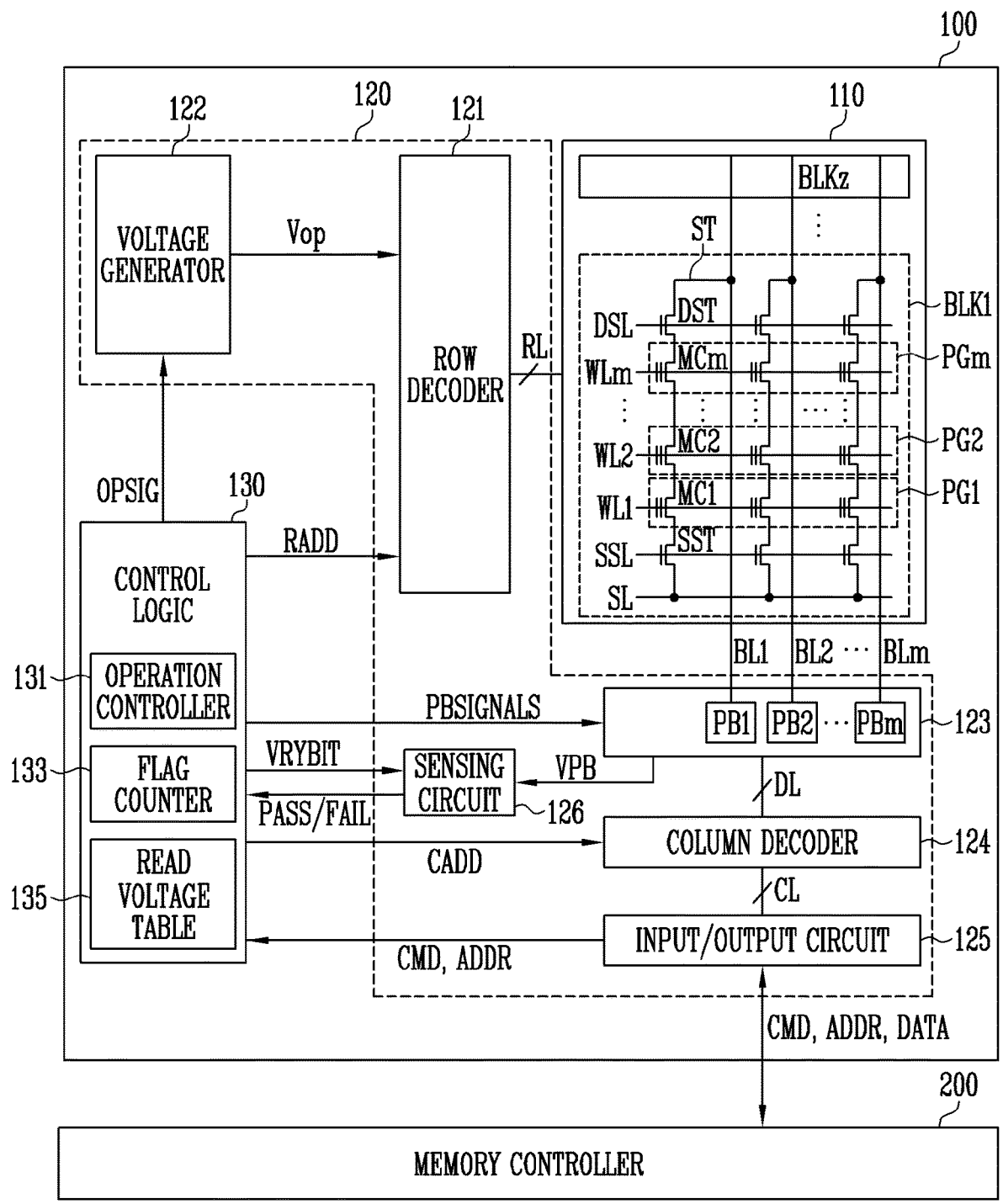
FIG. 1 is a diagram illustrating a storage device including a memory device in accordance with an embodiment of the present disclosure.

FIG. 1 is a diagram illustrating a storage device 1000 including a memory device 100 in accordance with an embodiment of the present disclosure.

Referring to FIG. 1, the storage device 1000 may store data under the control of a host. For example, the storage device 1000 may be one of various types of electronic devices including a multimedia card, a secure digital card, a Universal Serial Bus (USB) storage device, a Universal Flash Storage (UFS) device, a Peripheral Component Interconnect Express (PCI-E) card type storage device, a Compact Flash (CF) card, a Network Attached Storage (NAS), a Direct Attached Storage, and the like. The host may be one of various types of electronic devices including a mobile phone, a smart phone, an MP3 player, a laptop computer, a desktop computer, a game console, a TV, a tablet PC, an in-vehicle infotainment, and the like. In an embodiment, the storage device 1000 may be mounted inside the host or may be implemented as an electronic device which is located at the outside of the host.

The storage device 1000 may include the memory device 100 and a memory controller 200. The memory controller 200 may receive a request from the host, and control the memory device 100 to perform an operation corresponding to the request. For example, when the memory controller 200 transmits, to the memory device 100, a command CMD for a program operation, an address ADDR, and data DATA, the memory device 100 may perform, in response to the command CMD, the program operation of storing the data DATA in a page selected according to the address ADDR. For another example, when the memory controller 200 transmits, to the memory device 100, a command CMD for a read operation and an address ADDR, the memory device 100, in response to the command CMD, may perform a read operation of reading data DATA stored in a page selected according to the address ADDR and output the read data DATA to the memory controller 200. Hereinafter, the command CMD for the program operation is referred to as a program command, and the command CMD for the read operation is referred to as a read command.

The memory device 100 may include a memory cell array 110, a peripheral circuit 120, and a control logic 130.

The memory cell array 110 may include a plurality of memory blocks BLK1 to BLKz. For convenience of description, a first memory block BLK1 among the plurality of memory blocks BLK1 to BLKz will be representatively described. Descriptions of the first memory block BLK1 may be identically applied to the other memory blocks.

The first memory block BLK1 may include a plurality of memory cells MC1 to MCm. Each of the memory cells MC1 to MCm may represent a minimum unit for storing data. Each of the memory cells MC1 to MCm may be in one program state among a plurality of program states according to a threshold voltage. The program state may represent a specific value of data. For example, each of the memory cells MC1 to MCm may store a value of data according to a Multi-Level Cell (MLC) method, a Triple Level Cell (TLC) method, a Quad Level Cell (QLC) method, or the like. In the case of the MLC method in which a memory cell is capable of storing 2 bits, the number of erase/program states may be 4. In the case of the TLC method in which a memory cell is capable of storing 3 bits, the number of erase/program states may be 8. In the case of the QLC method in which a memory cell is capable of storing 4 bits, the number of erase/program states may be 16.

The first memory block BLK1 may include a plurality of pages PG1 to PGm. Each of the pages PG1 to PGm may include a plurality of memory cells connected to a corresponding word line among a plurality of word lines WL1 to WLm. The first memory block BLK1 may include a plurality of strings ST. Each string ST may include a source select transistor SST, a plurality of memory cells MC1 to MCm, and a drain select transistor DST. For example, a first terminal of the string ST may be connected to a first bit line BL1, and a second terminal of the string ST may be connected to a source line SL. A first terminal of another string ST may be connected to a corresponding bit line, and a second terminal of the another string ST may be commonly connected to the source line SL.

The peripheral circuit 120 may apply various operating voltages Vop to row lines RL and bit lines BL1 to BLm or discharge the applied operating voltages Vop under the control of the control logic 130.

In an embodiment, the peripheral circuit 120 may include a row decoder 121, a voltage generator 122, a page buffer group 123, a column decoder 124, an input/output circuit 125, and a sensing circuit 126.

The row decoder 121 may be connected to the plurality of memory blocks BLK1 to BLKz through the row lines RL. The row lines may include a source select line SSL, a plurality of word lines WL1 to WLm, and a drain select line DSL. The row decoder 121 may select at least one memory block among the memory blocks BLK1 to BLKz and at least one word line among the plurality of word lines WL1 to WLm according to a row address RADD received from the control logic 130. Further, the row decoder 121 may apply an operating voltage generated by the voltage generator 122 to the selected word line of the selected memory block and/or unselected word lines of the selected memory block. For example, in a program operation on a first page PG1, the row decoder 121 may apply a program voltage to a first word line WL1 connected to the first page PG1, and apply a program pass voltage to the other word lines WL2 to WLm. Further, in a read operation on the first page PG1, the row decoder 121 may apply a read voltage to the first word line connected to the first page PG1, and apply a read pass voltage to the other word lines WL2 to WLm.

The voltage generator 122 may generate an operation voltage in response to an operation signal OPSIG generated from the control logic 130. For example, the voltage generator 122 may generate the operating voltage by using an external power voltage supplied to the memory device 100. The operating voltage may include, for example, at least one of a program voltage, a verify voltage, a pass voltage, a read voltage, a read pass voltage, and an erase voltage.

The page buffer group 123 may be operated in response to page buffer control signals PBSIGNALS of the control logic 130. The page buffer group 123 may include a plurality of page buffers PB1 to PBm. Each of the page buffers PB1 to PBm may be connected to a string ST through a corresponding bit line among the bit lines BL1 to BLm. For example, in the read operation on the first page PG1, a first page buffer PB1 may sense a voltage or current of the first bit line BL1, thereby outputting, to the input/output circuit 125, data DATA corresponding to a program state of a first memory cell MC1 included in the first page PG1. Moreover, descriptions of the above-described first page buffer PB1 may be identically applied to the other page buffers.

The column decoder 124 may transfer data DATA between the input/output circuit 125 and the page buffer group 123 in response to a column address CADD. For example, the column decoder 124 may exchange data with first to mth page buffers PB1 to PBm through data lines DL or exchange data with the input/output circuit 125 through column lines CL.

The input/output circuit 125 may transmit a command CMD and an address ADDR, which are received from the memory controller 200, to the control logic 130. The input/output circuit 125 may transmit data DATA received from the memory controller 200 to the column decoder 124 or transmit data DATA received from the column decoder 124 to the memory controller 200.

In a read operation or a program verify operation, the sensing circuit 126 may generate a reference current in response to an allow bit signal VRBIT, and output a pass signal PASS or a fail signal FAIL according to a result obtained by comparing a sensing voltage VPB received from the page buffer group 123 with a reference voltage generated by the reference current.

The control logic 130 may control the peripheral circuit 120 by generating the operation signal OPSIG, the row address RADD, the page buffer control signals PBSI-GANLS, and the allow bit signal VRYBIT, in response to the command CMD and the address ADDR.

In an embodiment, the control logic 130 may include at least one of an operation controller 131, a flag counter 133, and a read voltage table 135.

When a read command for a selected page among the plurality of pages PG1 to PGM is received, the operation controller 131 may control the peripheral circuit 120 to perform a read operation on the selected page by using a read voltage. The selected page may be a page represented by an address ADDR received together with the read command among the plurality of pages PG1 to PGm. The operation controller 131 may determine the read voltage, based on a read count for the selected page and a reference value set for the selected page. The read count may represent a number of times a read operation of reading data stored in the selected page is performed after a program operation of storing the data in the selected page. The reference value may be a value set with respect to each of at least one page including the selected page when the program operation on the at least one page is performed. The program operation may be a single program operation on one page or be continuous program operations on a plurality of pages.

The flag counter 133 may include a flag value for each page.

The read voltage table 135 may include a compensation level corresponding to the flag value and the read voltage. The compensation level may be a level for compensating for a level of the read voltage.

Figure 2:
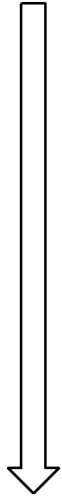
FIG. 2 is a diagram for describing a flag value in accordance with an embodiment of the present disclosure.

FIG. 2 is a diagram for describing a flag value in accordance with an embodiment of the present disclosure.

Referring to FIG. 2, the flag counter 133 (see FIG. 1) may include flag values fv1 to fv5 corresponding to pages PG1 to PG5. The flag values fv1 to fv5 may represent differences between reference values ref1 to ref5 and read counts rc1 to rc5. In an embodiment, the flag counter 133 may further include reference values ref1 to ref5 and read counts rc1 to rc5, which correspond to pages PG1 to PG5.

Each of the reference values ref1 to ref5 may be set whenever a program operation on a corresponding page among the pages PG1 to PG5 is performed.

In an embodiment, the operation controller 131 (see FIG. 1) may sequentially perform program operations on a plurality of pages PG1 to PG5 before a read command is received, and set a reference value for each of the plurality of pages PG1 to PG5. A first reference value ref1 for a first page PG1 among the plurality of pages PG1 to PG5 may be greater than or equal to a second reference value ref2 for a second page PG2 on which a program operation is performed after the first page PG1.

For example, the operation controller 131 may receive a program command, an address representing the plurality of pages PG1 to PG5, and data to be stored in the plurality of pages PG1 to PG5. The operation controller 131 may perform continuous program operations to store the data in the plurality of pages PG1 to PG5. The continuous program operations may be operations of sequentially performing a primary program operation on the first page PG1, a secondary program operation on the second page PG, a tertiary program operation on a third page PG3, a quaternary program operation on a fourth page PG4, and a quintic program operation on a fifth page PG5.

The operation controller 131 may set reference values ref1 and ref2 such that the first reference value ref1 for the first page PG1 is greater than or equal to the second reference value ref2 for the second page PG2, and store the reference values ref1 and ref2 in the flag counter 133. In this manner, the operation controller 131 may set third to fifth reference values ref3 to ref5 according to an order of the program operation and store the third to fifth reference values ref3 to ref5 in the flag counter 133. This is for the purpose of setting a degree to which a read voltage is compensated to become larger, since a degree to which a threshold voltage is changed is larger due to influence of remaining charges as the order of the program operation becomes earlier.

In an embodiment, when the continuous program operations are controlled to be sequentially performed, the operation controller 131 may set a value of 0 as a reference value with respect to a page in which the order of the program operation corresponds to an order posterior to a reference order. For example, when the reference order is 3, the fourth reference value ref4 for the fourth page PG4 and the fifth reference value ref5 for the fifth page PG5 may be set to 0 to be stored. This is for the purpose of rapidly performing a read operation as any read voltage is not compensated with respect to a page in which influence of charges due to the program operation is small among the plurality of pages PG1 to PG5. That is, a read voltage may be compensated with respect to a start page of the program operation or some pages adjacent thereto, and any read voltage may not be compensated with respect to the other pages.

A read count among the read counts rc1 to rc5 may represent a number of times a read operation on a corresponding page among the pages PG1 to PG5 is performed after a program operation on the corresponding page among the pages PG1 to PG5 is performed. For example, just after a program operation on the first page PG1, a first read count rc1 may be 0. When a read operation on the first page PG1 has been performed once after the program operation on the first page PG1 is performed, the first read count rc1 may be 1.

When a flag value for a selected page is 1 or more before a read operation is performed, the operation controller 131 may update the flag value with a value less than a flag value after the read operation is performed. For example, when the existing flag value is 1 or more, the operation controller 131 may update the flag value with a value decreased by 1 from the existing flag value after the read operation is performed. When the existing flag value is 0, the operation controller 131 may maintain the existing flag value as 0 after the read operation is performed.

In an embodiment, the operation controller 131 may acquire a compensation level corresponding to each of the flag values fv1 to fv5, and determine a level of a read voltage by using the compensation level. The read voltage may be a voltage applied to the selected page in the read operation. The compensation level may be a value set by pre-measuring a variation of the threshold voltage.

FIG. 3 is a diagram illustrating a read voltage table in accordance with an embodiment of the present disclosure.

Referring to FIG. 3, the operation controller 131 may acquire a compensation level corresponding to a flag value from a read voltage table 30. The operation controller 131 may determine a level of a read voltage by using the compensation level.

In an embodiment, the read voltage table 30 may include compensation levels corresponding to read voltages R1 to R7 and flag values. The read voltage table 30 shown in FIG. 3 represents a table for compensating for a read voltage according to the TLC method. Although the flag values included in the read voltage table 30 are illustrated as 0 to 9, this is merely an embodiment, and the number and values of flag values may be variously modified. In the case of the MLC method, the QLC method, and the like, subsequent descriptions may be identically applied to the MLC method, the QLC method, and the like, except only that the MLC method, the QLC method, and the like have different numbers of program states or different numbers of read voltages. Hereinafter, the TLC method will be described.

In an embodiment, a plurality of read voltages R1 to R7 may include low read voltages R1 to R3 for reading low program states lower than a middle program state and high read voltages R5 to R7 for reading high program states higher than the middle program state. For example, the plurality of program states may include zeroth to seventh program states. The zeroth program state may be an erase state, and a threshold voltage may become higher as a program state becomes close to the seventh program state. The middle program state may be the fourth program state corresponding to the middle among the other program states except the zeroth program state as the erase state.

The operation controller 131 may acquire a low compensation level corresponding to a flag value and the low read voltages R1 to R3 from the read voltage table 30, and determine a level of each of the low read voltages R1 to R3 by negatively compensating for a default low level as the low compensation level. This is for the purpose of compensating for when a threshold voltage of a memory cell corresponding to a low program state is decreased.

The operation controller 131 may acquire a high compensation level corresponding to a flag value and the high read voltages R5 to R7 from the read voltage table 30, and determine a level of each of the high read voltages R5 to R7 by positively compensating for a default high level as the high compensation level. This is for the purpose of compensating for when a threshold voltage of a memory cell corresponding to a high program state is increased.

In an embodiment, the plurality of read voltages R1 to R7 may further include a middle read voltage R4 for reading the middle program state.

The operation controller 131 may acquire a flag value and a middle compensation level corresponding to the middle read voltage R4 from the read voltage table 30, and determine a level of the middle read voltage R4 by compensating for a default middle level as the middle compensation level. In an embodiment, middle compensation levels R4_9 to R4_1 may be 0. That is, the operation controller 131 may determine the level of the middle read voltage R4 as the default middle level.

In an embodiment, the memory device 100 (see FIG. 1) may further include a Content Addressable Memory (CAM) block. The CAM block may store a default level of each of the plurality of read voltages. That is, the CAM block may store a plurality of default levels. The plurality of default levels may include a default high level, a default middle level, and a default low level. For example, when the memory device 100 is booted, the operation controller 131 may read the plurality of default levels from the CAM block.

In an embodiment, the high read voltages R5 to R7 may include a first high read voltage for reading a first high program state higher than the middle program state and a second high read voltage for reading a second high program state higher than the first high program state. For example, when the first high read voltage is the fifth read voltage R5, the second high read voltage may be the sixth read voltage R6 or the seventh read voltage R7. For example, when the first high read voltage is the sixth read voltage R6, the second high read voltage may be the seventh read voltage R7.

The operation controller 131 may determine a level of the first high read voltage by positively compensating for a first high compensation level corresponding to a flag value among a plurality of compensation levels included in the read voltage table 30. The operation controller 131 may determine a level of the second high read voltage by positively compensating for a second high compensation level higher than the first high compensation level. That is, a high compensation level of each of the high read voltages R5 to R7 corresponding to the same flag value may have a value which becomes larger as a program state becomes higher.

For example, when the flag value is 9, and high compensation levels for compensating for the high read voltages R5 to R7 are R5_9 to R7_9, values of the read voltage table 30 may be predetermined to have a relationship in which a seventh compensation level R7_9 is higher than or equal to a sixth compensation level R6_9, and the sixth compensation level R6_9 is higher than or equal to a fifth compensation level R5_9. The fifth compensation level R5_9 may be a level for compensating for the fifth read voltage R5 among the high read voltages R5 to R7, the sixth compensation level R6_9 may be a level for compensating for the sixth read voltage R6 among the high read voltages R5 to R7, and the seventh compensation level R7_9 may be a level for compensating for the seventh read voltage R7 among the high read voltages R5 to R7. Even in the case of a compensation level corresponding to another flag value, the same manner may be applied. This is for the purpose of compensating for when a degree to which a threshold voltage of a memory cell is shifted in a positive direction becomes larger as a program state of the memory cell becomes closer to a highest program state.

In an embodiment, the low read voltages R1 to R3 may include a first low read voltage for reading a first low program state lower than the middle program state and a second low read voltage for reading a second low program state lower than the first low program state. For example, when the first low read voltage is the third read voltage R3, the second low read voltage may be the first read voltage R1 or the second read voltage R2. For example, when the first low read voltage is the second read voltage R2, the second low read voltage may be the first read voltage R1.

The operation controller 131 may determine a level of the first low read voltage by negatively compensating for a first low compensation level corresponding to a flag value among the plurality of compensation levels included in the read voltage table 30. The operation controller 131 may determine a level of the second low read voltage by negatively compensating for a second low compensation level higher than the first low compensation level. That is, a low compensation level of each of the low read voltages R1 to R3 corresponding to the same flag value may have a value which becomes larger as a program state becomes lower.

For example, when the flag value is 9, and low compensation levels for compensating for the low read voltages R1 to R3 are R1_9 to R3_9, values of the read voltage table 30 may be predetermined to have a relationship in which a first compensation level R1_9 is higher than or equal to a second compensation level R2_9, and the second compensation level R2_9 is higher than or equal to a third compensation level R3_9. The first compensation level R1_9 may be a level for compensating for the first read voltage R1 among the low read voltages R1 to R3, the second compensation level R2_9 may be a level for compensating for the second read voltage R2 among the low read voltages R1 to R3, and the third compensation level R3_9 may be a level for compensating for the third read voltage R3 among the low read voltages R1 to R3. Even in the case of a compensation level corresponding to another flag value, the same manner may be applied. This is for the purpose of compensating for when a degree to which a threshold voltage of a memory cell is shifted in a negative direction becomes larger as a program state of the memory cell becomes closer to a lowest program state.

In an embodiment, among the compensation levels included in the read voltage table 30, a first compensation level corresponding to a first flag value and the first read voltage may be higher than or equal to a second compensation level corresponding to a second flag value less than the first flag value and the first read voltage. That is, with respect to the same read voltage, the compensation level becomes higher as the flag value becomes larger.

For example, when the first flag value is 9 and the second flag value is 8 less than the first flag value, the first compensation level R1_9 corresponding to the first flag value (e.g., 9 or the like) and the first read voltage R1 may be higher than or equal to a second compensation level R1_8 corresponding to the second flag value (e.g., 8 or the like) and the first read voltage R1. That is, among compensation levels 0 to R1_9 corresponding to the first read voltage R1, the second compensation level R1_8 corresponding to a lesser flag value may be lower than or equal to the first compensation level R1_9 corresponding to a larger flag value. This may be identically applied to read voltages different from the first read voltage R1. That is, since influence of remaining charges may be reduced as a read voltage is repeatedly performed, its compensation degree may be set to become small.

In an embodiment, a compensation level corresponding to a flag value as 0 and the plurality of read voltages R1 to R7 may be 0. That is, when the flag value is 0, compensation for the read voltages R1 to R7 may be made. A level of each of the read voltages R1 to R7 may be a default level corresponding to a program state.

Figure 4:
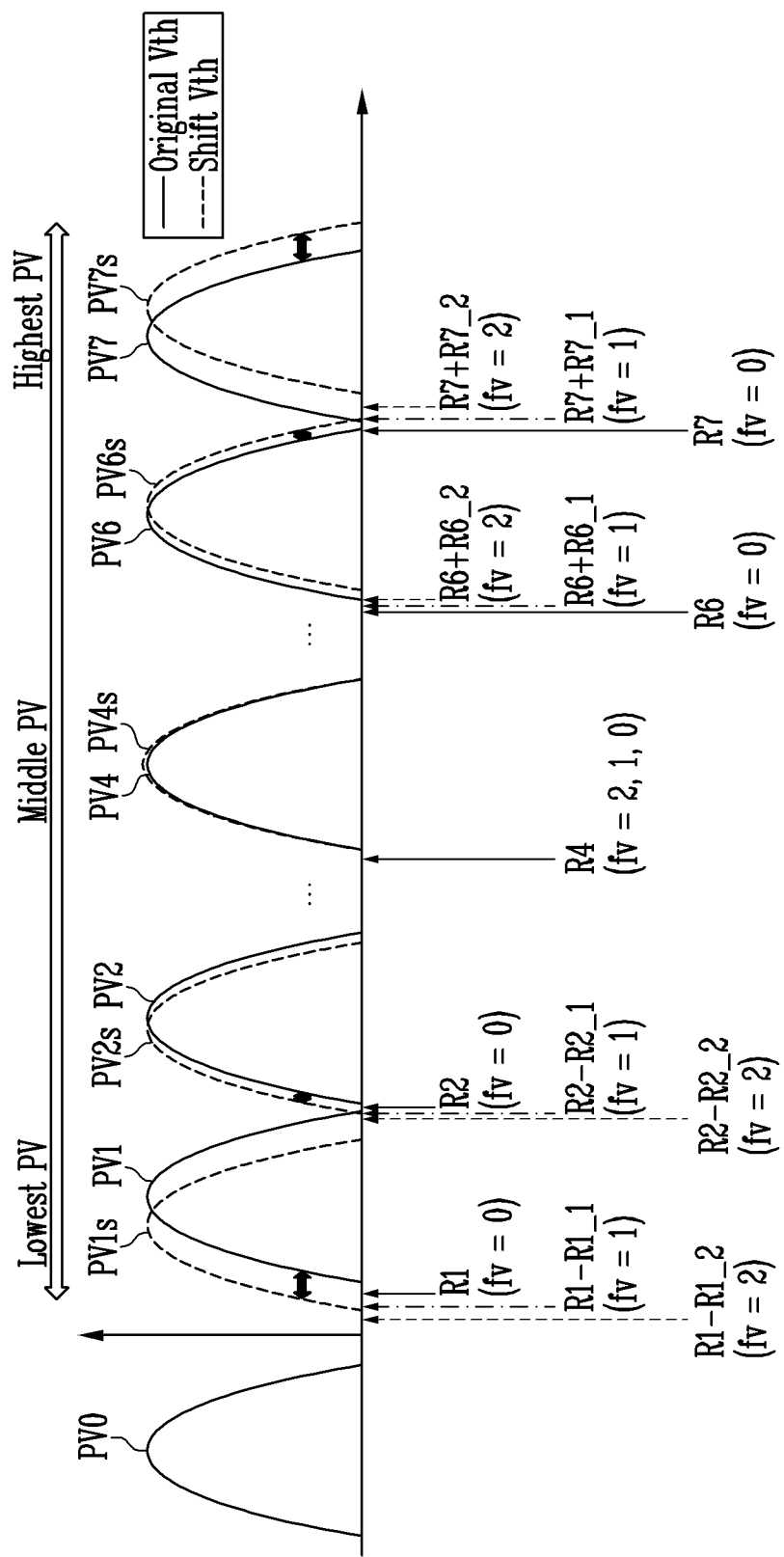
FIG. 4 is a diagram for describing read voltages in accordance with an embodiment of the present disclosure.

FIG. 4 is a diagram for describing read voltages in accordance with an embodiment of the present disclosure.

Referring to FIG. 4, when a program operation on a page is performed, a plurality of memory cells included in the page may have an erase state PV0 or one of a plurality of program states PV1 to PV7 according to a threshold voltage. The plurality of program states PV1 to PV7 may include low program states PV1 and PV2, a middle program state PV4, and high program states PV6 and PV7, which are distinguished from each other according to a level of the threshold voltage.

Just after the program operation is performed, the program states PV1 to PV7 may be shifted to distorted program states PV1s to PV7s due to influence of remaining charges.

A degree to which a threshold voltage of a memory cell is shifted may be increased in a positive direction as approaching a highest program state PV7 from the middle program state PV4. When a flag value fv is 1 or more, the memory device 100 (see FIG. 1) may compensate a seventh read voltage R7 corresponding to a higher program state among read voltages R6 and R7 for reading the high program states PV6 and PV7, for a value higher in the positive direction than a sixth read voltage R6 with respect to the same flag value fv. For example, a seventh compensation level R7_2 for compensating for the seventh read voltage R7 may be higher than a sixth compensation level R6_2 for compensating for the sixth read voltage R6.

The degree to which the threshold voltage of the memory cell is shifted may be increased in a negative direction as approaching a lowest program state PV1 from the middle program state PV4. When the flag value fv is 1 or more, the memory device 100 (see FIG. 1) may compensate a first read voltage R1 corresponding to a lower program state among read voltages R1 and R2 for reading the low program states PV1 and PV2, for a value higher in the negative direction than a second read voltage R2 with respect to the same flag value fv. For example, a first compensation level R1_2 for compensating for the first read voltage R1 may be higher than a second compensation level R2_2 for compensating for the second read voltage R2.

Moreover, the degree to which the threshold voltage of the memory cell is shifted may become smaller as a read operation is performed. The memory device 100 may decrease a read count or a flag value fv as the read operation is performed.

Further, the degree to which the threshold voltage of the memory cell is shifted may become smaller as an order of the program operation becomes later or as a page becomes more distant from a page in which the program operation is started. When a program operation on a plurality of pages is performed, the memory device 100 may decrease a reference value or a flag value fv as an order of the program operation becomes later or as a page becomes more distant from a page in which the program operation is started.

As described above, in the memory device 100, when a read operation is performed, a level of a read voltage is anticipatively compensated using a number of times the read operation is performed from after a program operation is performed, so that valid data can be read without performance deterioration.

Figure 5:
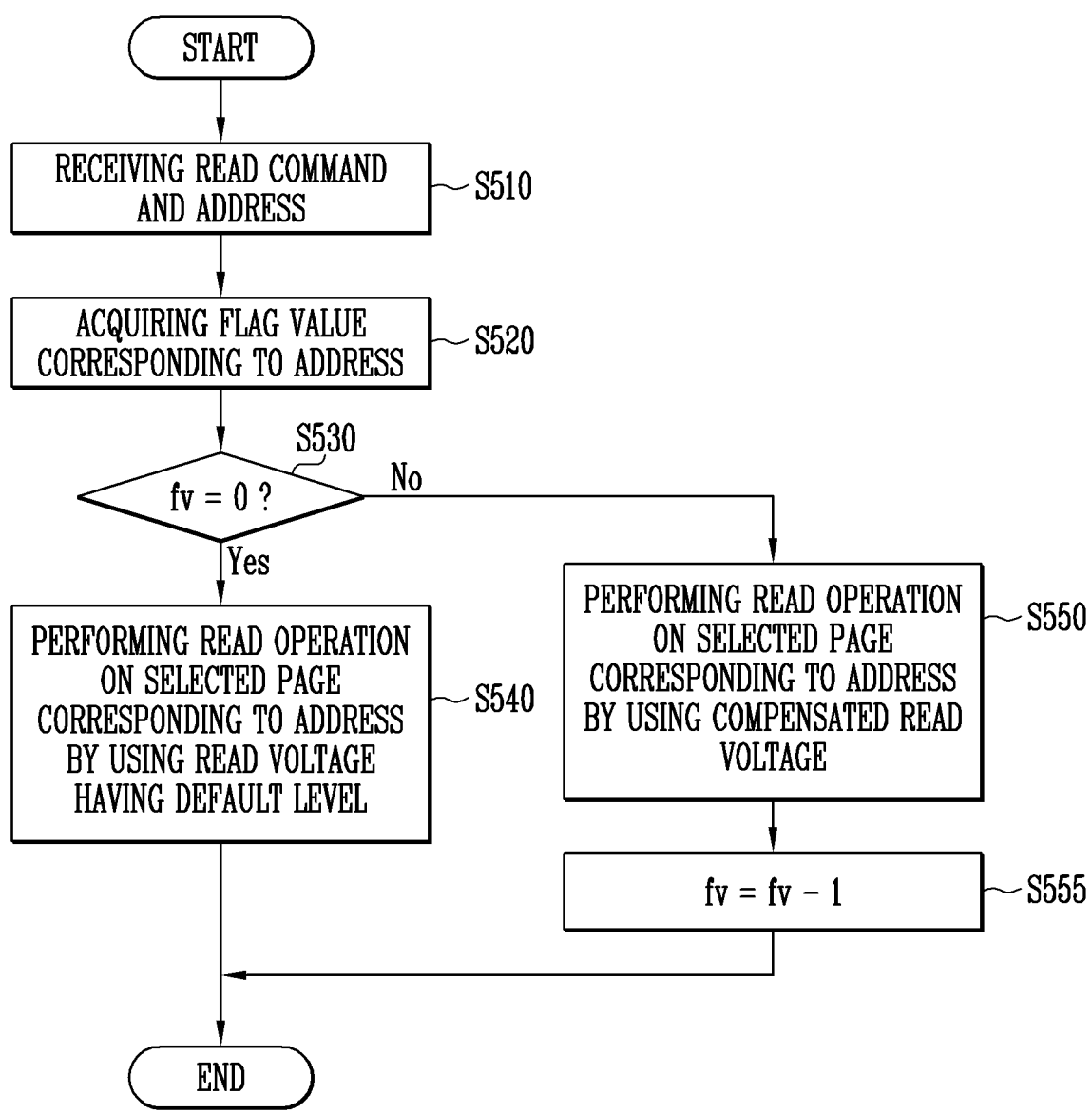
FIG. 5 is a diagram for describing an operating method of the memory device in accordance with an embodiment of the present disclosure.

FIG. 5 is a diagram for describing an operating method of the memory device in accordance with an embodiment of the present disclosure.

Referring to FIG. 5, the operating method of the memory device 100 may include receiving a read command and an address (operation S510), acquiring a flag value as a difference between a reference value set for a selected page corresponding to the address among a plurality of pages and a read count representing a number of times a read operation is performed after a program operation on the selected page (operation S520), and performing the read operation on the selected page by using a read voltage having a default level or a compensated read voltage according to the flag value (operation S540 or S550).

In an embodiment, the operating method of the memory device 100 may further include operations of sequentially performing program operations on a plurality of pages before the read command is received and setting a reference value for each of the plurality of pages. A reference value for a first page among the plurality of pages may be greater than or equal to a reference value for a second page on which the program operation is performed after the first page.

In an embodiment, the operating method of the memory device 100 may further include an operation of, after a read operation is performed using the compensated read voltage (operation S550), updating the flag value as a value less than the flag value (operation S555).

In an embodiment, when the flag value is 0 (Yes in the operation S530), the read operation may be performed using the read voltage having the default level (the operation S540). When the flag value is greater than 0 (No in the operation S530), the read operation may be performed using the compensated read voltage (the operation S550). The default level may be stored in the CAM block.

In an embodiment, the operating method of the memory device 100 may further include an operation of storing a read voltage table including flag values and compensation levels corresponding to read voltages. When the flag value is greater than 0 (No in the operation S530), a compensation level corresponding to the flag value may be acquired from the read voltage table. Then, the default level may be compensated as the compensation level, so that a compensated read voltage can be generated. The compensated read voltage may be applied to a word line connected to the selected page, and a read pass voltage may be applied to a word line connected to an unselected page, thereby performing the read operation.

In accordance with embodiments of the present disclosure, there can be provided a memory device for reading valid data without performance deterioration, and an operating method of the memory device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory device comprising:
a memory block including a plurality of pages; and
a control logic configured to control, when a read command for a selected page among the plurality of pages is received, a read operation on the selected page to be performed using a plurality of read voltages,
wherein the plurality of read voltages are determined based on a reference value for the selected page and a read count representing a number of times a read operation of reading data stored in the selected page is performed after a program operation of storing data in the selected page,
wherein control logic is further configured to set the reference value for the selected page according to an order of the program operation to be sequentially performed on the plurality of pages.

2. The memory device of claim 1, wherein the control logic includes a flag counter configured to store a difference between the reference value and the read count as a flag value.

3. The memory device of claim 2, wherein the control logic further includes an operation controller configured to determine levels of the plurality of read voltages by using a plurality of compensation levels corresponding to the flag value.

4. The memory device of claim 3, wherein the plurality of read voltages include a first low read voltage for reading a first low program state lower than a middle program state among a plurality of program states, and a first high read voltage for reading a first high program state higher than the middle program state, and
wherein the operation controller is configured to determine a level of the first low read voltage by negatively compensating for a first low compensation level among the plurality of compensation levels, and determine a level of the first high read voltage by positively compensating for a first high compensation level among the plurality of compensation levels.

5. The memory device of claim 4, wherein the plurality of read voltages further includes a second high read voltage for reading a second high program state higher than the first high program state, and
wherein the operation controller is configured to determine a level of the second high read voltage by positively compensating for a second high compensation level higher than the first high compensation level among the plurality of compensation levels.

6. The memory device of claim 4, wherein the plurality of read voltages further includes a second low read voltage for reading a second low program state lower than the first low program state, and
wherein the operation controller is configured to determine a level of the second low read voltage by negatively compensating for a second low compensation level higher than the first low compensation level among the plurality of compensation levels.

7. The memory device of claim 4, wherein the plurality of read voltages further include a middle read voltage for reading the middle program state, and
wherein the operation controller determines, as a level of the middle read voltage, a default middle level read from a Content Addressable Memory (CAM) block.

8. The memory device of claim 3, wherein the control logic includes a read voltage table including the plurality of compensation levels corresponding to a plurality of flag values and the plurality of read voltages, and
wherein the operation controller is configured to acquire the plurality of compensation levels corresponding to the flag value from the read voltage table.

9. The memory device of claim 8, wherein a first compensation level, corresponding to a first flag value and a first read voltage among the compensation levels included in the read voltage table, is higher than or equal to a second compensation level corresponding to a second flag value which is less than the first flag value and the first read voltage.

10. The memory device of claim 3, wherein the operation controller is further configured to sequentially perform program operations on the plurality of pages before the read command is received, and set a reference value for each of the plurality of pages, and wherein a reference value for a first page among the plurality of pages is greater than or equal to a reference value for a second page on which the program operation is performed after the first page.

11. The memory device of claim 3, wherein the operation controller is further configured to update, when the flag value for the selected page is 1 or more before the read operation is performed, the flag value with a value less than the flag value after the read operation is performed.

12. A method of operating a memory device, the method comprising:

receiving a read command and an address;

acquiring, as a flag value, a difference between a reference value for a selected page corresponding to the address among a plurality of pages and a read count, the read count representing a number of times a read operation is performed after a program operation on the selected page; and performing a read operation on the selected page by using a read voltage having a default level or a compensated read voltage according to the flag value, wherein the reference value for the selected page is set according to an order of the program operation to be sequentially performed on the plurality of pages.

13. The method of claim 12, further comprising sequentially performing, before receiving the read command, program operations on the plurality of pages to set a reference value for each of the plurality of pages, wherein a reference value for a first page among the plurality of pages is greater than or equal to a reference value for a second page on which the program operation is performed after the first page.

14. The method of claim 12, further comprising updating the flag value with a value less than the flag value after the read operation is performed using the compensated read voltage.

15. The method of claim 12, wherein the performing of the read operation includes performing the read operation by using the read voltage having the default level, when the flag value is 0.

16. The method of claim 12, wherein the performing of the read operation includes performing the read operation by using the compensated read voltage, when the flag value is greater than 0.

17. The method of claim 16, further comprising storing a read voltage table including a compensation level corresponding to a flag value and a read voltage, wherein the performing of the read operation by using the compensated read voltage includes:

acquiring a compensation level corresponding to the flag value from the read voltage table, when the flag value is greater than 0; and generating the compensated read voltage by compensating the default level for the compensation level.

18. The method of claim 17, wherein a first compensation level, among compensation levels included in the read voltage table, corresponding to a first flag value and the read voltage is higher than or equal to a second compensation level corresponding to a second flag value which is less than the first flag value and the read voltage.

19. A memory device comprising:

a memory block including a plurality of pages; and a control logic configured to:

set a reference value for each of the plurality of pages according to an order of program operations to be sequentially performed on the plurality of pages;

receive a read command for a selected page among the plurality of pages after setting the reference value for each of the plurality of pages;

acquire, as a flag value, a difference between a reference value for the selected page and a read count, the read count representing a number of times a read operation of reading data stored in the selected page is performed after a program operation of storing data in the selected page; and control a read operation to be performed on the selected page by using a read voltage having a default level or a compensated read voltage according to the flag value.

20. The memory device of claim 19, wherein a reference value for a first page among the plurality of pages is greater than or equal to a reference value for a second page on which the program operation is performed after the first page.

* * * * *